(12) United States Patent
Franz et al.

(10) Patent No.: US 6,703,937 B1
(45) Date of Patent: Mar. 9, 2004

(54) FILTERING APPARATUS FOR FILTERING COMPRESSED AIR

(75) Inventors: Jochen Franz, Reutlingen (DE); Günter Gebauer, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/111,031

(22) PCT Filed: Oct. 5, 2000

(86) PCT No.: PCT/EP00/09747

§ 371 (c)(1),
(2), (4) Date: Apr. 18, 2002

(87) PCT Pub. No.: WO01/30484

PCT Pub. Date: May 3, 2001

(30) Foreign Application Priority Data

Oct. 28, 1999 (DE) .......................... 199 51 962

(51) Int. Cl.⁷ .............................................. G08B 21/00
(52) U.S. Cl. ........................................ 340/607; 73/1.57
(58) Field of Search ................... 340/607, 608, 340/609, 610; 73/1.57, 1.68; 128/205.12, 202.22

(56) References Cited

U.S. PATENT DOCUMENTS

| | | |
|---|---|---|
| 4,751,501 A | 6/1988 | Gut |
| 5,511,413 A | 4/1996 | Pfister et al. |
| 5,606,311 A | 2/1997 | Polidan et al. |
| 5,830,249 A * | 11/1998 | Hori et al. ................ 55/283 |
| 6,035,851 A * | 3/2000 | Wallen ................ 128/202.22 |
| 6,052,058 A * | 4/2000 | Knox .................. 340/607 |
| 6,161,417 A * | 12/2000 | Nepsund ............... 73/1.68 |

FOREIGN PATENT DOCUMENTS

| | | |
|---|---|---|
| DE | 19607740 A1 | 9/1997 |
| EP | 0788826 A1 | 8/1997 |
| EP | 0841083 A1 | 5/1998 |

OTHER PUBLICATIONS

Der Pneumatic–Katalog 97/98, Festo, 9.3/15–1 (with English language equivalent).

* cited by examiner

Primary Examiner—John Tweel
(74) Attorney, Agent, or Firm—Hoffman & Baron, LLP (57) ABSTRACT

A filter device for filtering compressed air having recognition means (24), which render possible recognition of the degree of contamination of the filter means (6) fitted. The recognition means (24) comprise a pressure differential sensor means (25) responsive to the pressure differential at the filter means (6) and a flow rate sensor means (26) responsive to the flow rate. Furthermore there is an electronic evaluating means (27) for linking the detected pressure differential values and the flow rate values to give a condition value relevant for the degree of contamination of the filter means (6) and to be compared with predetermined threshold values.

16 Claims, 4 Drawing Sheets

FILTERING APPARATUS FOR FILTERING COMPRESSED AIR

FIELD OF THE INVENTION

The invention relates to a filter device for filtering compressed air comprising a principal fluid duct extending between an inlet and an outlet and divided by filter means, through which compressed air flows in operation, into an inlet flow section and an outlet flow section.

BACKGROUND OF THE INVENTION

Filter devices of this type, as are disclosed for instance in the assignee's "Pneumatic-Katalog 97/98", page 9.3/15-1 as a rule comprising a housing with a principal body having the inlet and the outlet and a vessel-like filter shell fixed thereto in a detachable manner. In the space defined between the principal body and the filter shell a replaceable and preferably cartridge-like filter means is sealed, which divides up the principal fluid duct extending between the inlet and the outlet into an outlet flow section associated with the inlet and an inlet flow section associated with the outlet. Compressed air supplied by way of the inlet is cleaned on flowing through the filter means and freed of impurities. Such a filter means is to an overwhelming extent employed for the treatment of compressed air in compressed air supply systems, it normally being utilized as part of so-called servicing units, which may include further components such as regulators or oilers.

In the case of excessive contamination of the filter means employed replacement is necessary for further operation of the machines and devices connected with the associated compressed air supply system without impairment. In this respect finding the right point in time for cleaning or replacement of the filter means is a problem. Although the assignee is aware of plans to find the point in time in question on the basis of the pressure drop between the inlet flow section and the outlet flow section of the principal fluid duct, this method of measurement is extremely inaccurate.

SUMMARY OF THE INVENTION

Object of the present invention is to provide a filter device of the type initially mentioned, in the case of which the point in time appropriate for replacement or cleaning of the filter means may be reliably found.

In order to achieve this object the filter device is provided with means for the recognition of the degree of contamination of the filter means, which comprise a pressure differential sensor means responsive to the pressure differential between the inlet flow section and the outlet flow section and furthermore a flow rate sensor means responsive to the rate of flow in the principal fluid duct and is further provided with an electronic evaluating means for linking the detected pressure differential data and the flow rate data to produce a condition value relevant for the degree of contamination of the filter means for comparison with predetermined threshold values.

The recognition means for the degree of contamination of the filter means used accordingly process both the pressure differential between the inlet flow section and the outlet flow section of the principal fluid duct as well as the instantaneous flow rate in the principal fluid duct, the detected values being linked in an electronic evaluating means to yield a condition value relevant for the degree of contamination, such condition value then being able to be compared with the predetermined threshold values. The comparison measures may in principle be undertaken externally, as for example by comparison with predetermined reference tables, but are however preferably performed in the electronic evaluating means as well, which for this purpose may be provided with a comparison means.

By taking into account both the pressure differential and also the flow rate it is possible for the degree of contamination to be found reflecting the current operating conditions, it being taken into account as well that the pressure differential varies in accordance with the given flow rate. If only the pressure differential were to be employed for recognition of the degree of contamination, this could admittedly be used in connection with permanently set flow rate to indicate certain features of the degree of contamination. However, once in the operation of a compressed air supply network changes occur in the flow rate owing to switching loads on or off, this results in faulty data if the same set value applies with only one pressure differential threshold value. By additionally taking into account the flow rate it is then possible to see, independently of the flow rate, that a critical degree of contamination has been reached.

Further advantageous developments of the invention are defined in the dependent claims.

The electronic evaluating means preferably comprises a memory for storage of threshold values applying at least one filter means type. If the filter device is only designed for use with one single specific filter means type, the threshold values may be assigned in accordance with this one type of filter means. As an alternative it is possible for a plurality of different filter means types to be stored in the memory means, a selection means being present, which in a manner dependent on the actually installed filter means type renders possible a type-specific threshold value selection. This can for example be ensured by having manual settings, more especially by using a switch arrangement and/or using a potentiometer arrangement. However, a design is more convenient in which the filter device additionally has a detection means, which has means for the recognition of the currently installed filter type and which can generate a filter type specific electrical detection signal, which may be employed in the evaluating means for the type specific selection of threshold values. The detection means may for example have activating means provided on the filter means, such activating means cooperating directly or indirectly with the sensor means on the housing when the filter means is installed for producing a detection signal.

The filter device renders possible even more universal operation, when the means for the recognition of the degree of contamination additionally comprise a sensor means responsive to the inlet pressure in the inlet flow section of the principal fluid duct, the inlet pressure value found being taken into account in the electronic evaluating means for finding the instantaneous condition value. In this case for finding the critical degree of contamination values the current pressure conditions are taken into account as well, it being possible for the arrangement to be such that in a memory means different threshold values are stored in a memory means for one or more types of filter means in each case dependent on the inlet pressure, such different threshold values being able to be selected using a selection means dependent on the inlet pressure.

It is an advantage if the threshold values for one respective filter means may be set in a variable manner so that if necessary it is possible to make adaptations or with respect to further types of filter means to select particular specific threshold values.

The filter device may furthermore comprise an indicator means, which indicates the current condition value of the degree of contamination and/or reaching or exceeding the threshold values for one filter means. The indication can for example be optical or acoustic and/or involve the issue of an electrical indicating signal, which may be processed if required. The threshold values for a respective filter means may more particularly be in the form of a threshold value characteristic curve or of a threshold value characteristic curve set.

If required it is additionally possible to have a predetermined threshold value in the form of a maximum pressure differential value independent of the flow rate, which for example corresponds to a condition, in which profitable operation is no longer possible.

The evaluating means could be provided externally of the filter device. However, to have compact dimensions it is preferred to use a design of the evaluating means as a direct component of the filter device or of a compressed air servicing device comprising the filter device in it. In any case the evaluating means may be integrated in a control means, which controls certain machine or device operation sequences.

In the following the invention will be described with reference to the accompanying drawings in detail

DETAILED DESCRIPTION OF THE PREFERRED EMBODIMENTS

The filter device generally referenced 1 comprises a housing with, as an example, a block-like principal body 2, a beaker-like filter shell 3 secured to the bottom side thereof, and a head piece 4 mounted at the top on the principal body 2.

Together with the principal body 2 the filter shell 3 delimits a filter space 5, wherein a cartridge like filter means 6 is received in a replaceable manner.

The filter means 6, which has a tubular structure, is mounted at the bottom on the principal body 2 and detachably joined to it. For attachment in the present case an attachment screw 7 is employed, which is inserted from below through the central space 8 of the filter means 6, it acting on the filter means 6 from below at a disk 12 and its top end being screwed fixedly in the female thread of an attachment part 13 connected with the principal body 2 in its axial direction. The latter is in the working example attached as a separate component to the principal body 2 and has a sleeve-like form.

The filter device 1 has a principal fluid duct 14 extending through it, which has an inlet 15 and an outlet 16, of which both are provided preferably at mutually opposite outer sides on the principal body 2. The inlet 15 and the outlet 16 are provided with connecting means, not illustrated in detail, which render possible a detachable connection with fluid ducts leading to external instrumentalities. The filter device 1 has compressed air flowing through it during operation, such air being supplied by way of the above mentioned fluid ducts to the inlet 15 and let off by way of the outlet 16.

The filter means 6 is placed on the principal fluid duct 14 which it divides up same into an inlet flow section 17 associated with the inlet 15 and an outlet flow section 18 associated with the outlet 16. The inlet flow section 17 extends at the outer periphery of the filter means 6 into the filter space 5, whereas the outlet flow section 18 communicates with the space 8 of the filter means 6. The compressed air arriving accordingly flows through the filter means 6 in the interior of filter space 5 from the outside to the inside and leaves by way of the space 8 and the outlet flow section 18 through the outlet. On flowing through the filter means 6 the compressed air is filtered and freed of contaminants, same being held back in the filter means 6.

The direction of flow could also be reversed. As a rule the direction of flow of the air will be dependent on the type of filter means 6 employed.

The filter device 1 may be termed a servicing device for preparing compressed air placed at a certain point in compressed air supply system or network. As described it may be utilized as a stand-alone device. However, combined use together with one or more further servicing devices is possible, as for example with a regulating device and/or an oiling device, it being possible for it to be combined in a module with further devices as a servicing unit. Further servicing devices may be connected with the outer sides having the inlet 15 and the outlet 16 in lieu of the above mentioned fluid lines.

Owing to retention of contaminants the filter pores of the filter means 6 gradually become clogged and the filter means 6 is fouled up. In good time and while the compressed air's flow rate is still satisfactory through the filter means 6, that is to say before the amount of air passing through the filter means per unit time, has dropped to below a critical amount, which is more particularly dependent on the loads connected with the compressed air network, it is necessary for the filter means 6 to be cleaned or replaced by a clean new filter means 6. The deinstallation of the filter means 6 necessary for this is performed by removal of the filter shell 3 and the attachment screw 7, whereafter the filter means 6 may be pulled off downward in a deinstallation direction 22 coinciding with the longitudinal axis of the filter means. The following renewed fitting is implemented in the opposite direction, the installation direction 21 of the filter means 6 being opposite to the deinstallation direction 22 in an upward direction.

Figure 6:
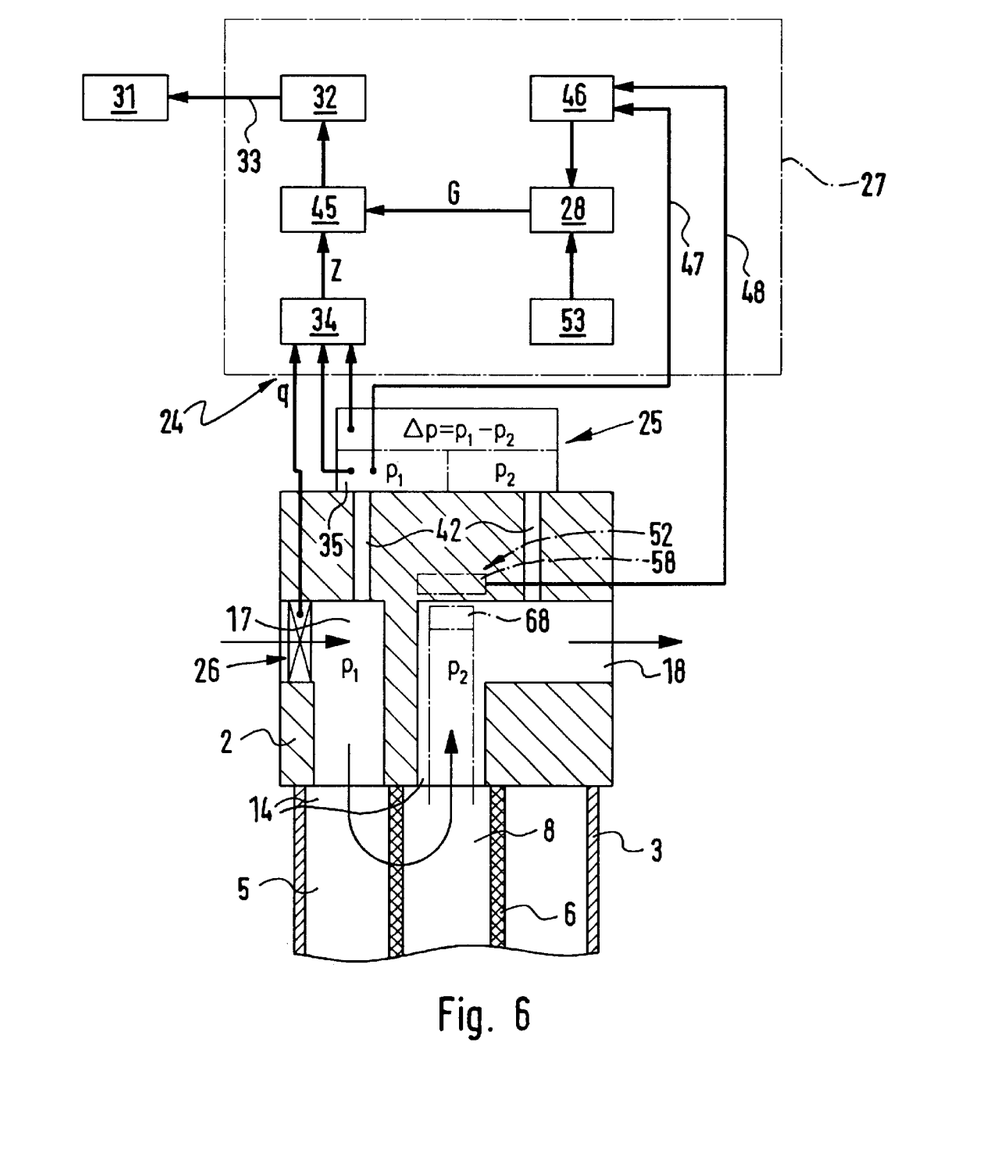
FIG. 6 is a highly diagrammatic representation of the filter device to explain an advantageous design of the electronic evaluating means.

In order to find the point in time suitable for the replacement or, respectively, cleaning of the filter means 6 the filter device is provided with means for recognition of the degree of contamination of the filter means 6, which in the following will be termed recognition means 24 for the sake of simplicity. Referring as well to FIG. 6 it will be perceived that the recognition means 24 comprises a pressure differential sensor means 25 responsive to the pressure differential $\Delta p$ between the inlet flow section 17 and the outlet flow section 18 of the principal fluid duct 14, and furthermore a flow rate sensor means 26 responsive to the flow rate in the principal fluid duct 14. Furthermore, the recognition means 24 comprise an electronic evaluating means 27 in which the detected pressure differential and flow rate data are linked to produce a condition value "Z" relevant for the degree of contamination of the filter means 6 and are compared with threshold values "G" held in a memory means 28. An indicating means 32, also belonging to the electronic evaluating means 27 is able to indicate the currently detected condition value and/or reaching or exceeding the threshold values for the respective filter means. The indication could be optical and/or acoustic, but however in this case it involves the issue of electrical indication signal 33 able to be further processed in an electronic control means 31.

The stored threshold value are formed on the same basis as the condition values, that is to say so as to include values for pressure differential and flow rate.

The pressure differential sensor means 25 is, in the present working example of the invention, so designed that it detects both the inlet pressure value $p_1$ obtaining in the inlet flow section 17 and also the outlet pressure value $p_2$ obtaining in the outlet flow section 18 and on the basis of thereof finds the pressure differential. $\Delta p = p_1 - p_2$. This pressure differential value $\Delta p$ is, just like the associated flow rate q, linked within a processing or logic network 34 of the electronic evaluating means 27 to yield a current condition value "Z", the inlet pressure value $p_1$ preferably being taken into account independently during such linking. The function of the respective inlet duct sensor means 35 is simply taken from the pressure differential sensor means 25, even although a separate sensor means could be provided as well.

In the working embodiment the pressure differential sensor means 25 is accommodated in the interior of the head piece 4. It is mounted on a support plate 36 preferably in the form of a printed circuit board 36, which is arranged on the inner side of a floor part 37 of the head piece 4 at which the head piece 4 is seated on the principal body 2. Direction changing parts 38 or baffles, provided with internal fluid ducts, of the pressure differential sensor means 25 extend through the floor part 37 and fit in a sealed manner into two connection ducts 42 extending in the principal body 2, one of such connection ducts being connected with the inlet flow section 17 while the other one is connected with the outlet flow section 18. This means that the pressure signals pass to the pressure differential sensor means 25, which may thus be arranged in an advantageous manner outside the principal body 2.

A cover part 43 mounted on the floor part 37, of the head piece 4, ensures that the pressure differential sensor means 25 is accommodated in a protected manner.

The flow rate sensor 26 is, in the present working example of the invention, accommodated in the inlet flow section 17 of the principal duct 14, although it might well be placed at some other point in the principal fluid duct 14 or be designed in the form of a means separately installed in the filter device 1. The integrated design renders possible compact dimensions with the least complexity of connections.

Figure 7:
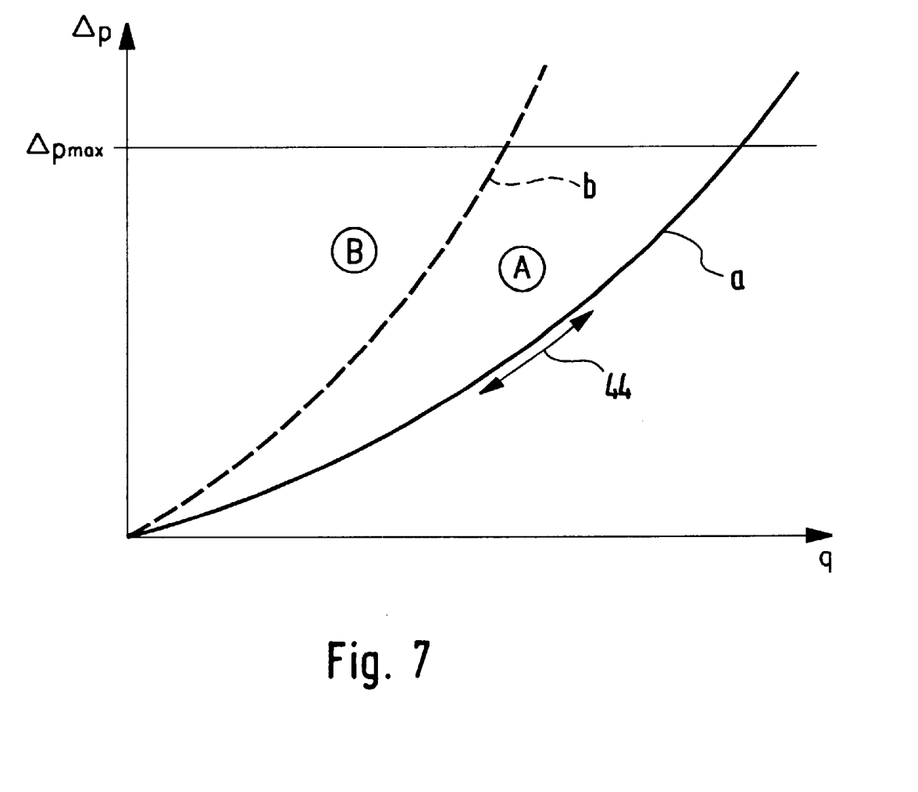
FIG. 7 is a graph, which indicates the workings of the means serving for recognition of the degree of contamination of the filter means, the pressure drop $\Delta p$ being plotted against the flow rate q on the one hand in the case of the new condition of a filter means in the form of the curve "a" as a condition value curve and on the other hand as a threshold value representing the set threshold values as curve "b".

In a case wherein the filter device 1 is only designed for one particular type of filter means and operation using only one predetermined inlet pressure pi, it would be possible for the associated threshold values "G" to be held in the form of a threshold value characteristic curve or function in the memory means 28. Such a threshold value characteristic curve "b" is indicated in FIG. 7 by way of example in chained lines and indicates the permissible pressure differential values $\Delta p$ as a function of the flow rate q. FIG. 7 shows the condition value characteristic curve "a" becoming established in the filter means 6 of the respective type when the filter means is not clogged up. The condition values "Z" found in the linking means 34 therefore are on this condition value characteristic curve when the filter means 6 is not clogged, and same move on the curve in a manner dependent on the flow rate in accordance with the double arrow 44.

The evaluating means 27 comprises a comparison means 45, in which the currently found condition value "Z" is compared with the threshold value "G" held in the memory means 28. As long as the condition values then found remain within the range A—in FIG. 7 this is the range underneath the threshold value characteristic curve "b"–normal operation of the filter device 1 will be taking place, there being however the possibility of the indicating means 32 providing information about the associated threshold values "G" with a comparison for checking purposes. It is however more expedient to have a system such that an indicating signal 33 is only issued by the indicating means 32, when the currently found condition value "Z" has reached the threshold value characteristic curve "b" or exceeds the prohibited range B lying above the threshold value characteristic curve "b".

Since for recognition of the degree of contamination both during detection of the current condition value and also within the stored threshold value the dependencies between the pressure differential $\Delta p$ and the current flow rate q are taken into account, it is possible, independently of the flow rate existing due to operation, to provide extremely reliable information. If as a threshold value for instance only one pressure differential value, independent of the flow rate, were given, it would be admittedly possible for it to be relevant as regards a predetermined larger volumetric flow, for a smaller volumetric flow it would be much too large so that exceeding the threshold value would be recognized far too late. Nevertheless, it may be expedient to provide additionally a threshold value in the form of a maximum pressure differential value $\Delta p_{max}$, independent of the flow rate, and which in all operational conditions indicates that threshold value range, in which any further operation of the filter means would not be appropriate.

While the filter device 1 in this case is designed for operation with a varying inlet pressure $p_1$, it is possible for an extensive set of threshold value characteristics to be stored in the memory means 28, which comprises the appropriate threshold value characteristic curve for each or for selected inlet pressures. In such a case the evaluating means 27 will conveniently be provided with a selection means 46, using which it is possible to select the right threshold value characteristic curve dependent on pressure. The selection dependent on the inlet pressure may be performed manually or preferably automatically, a first selection signal 47 being derived in the latter case by means of the inlet pressure sensor means 35 and being supplied to the selection means 46.

In a fashion dependent on the particular application it is possible for the filter device to be run with different types of filter means 6, that is to say with filter means of different overall size, different structure, different fineness of the filter pores and the like. The recognition means 24 are then so designed that they take into account the different filter means types during finding the degree of contamination. This is performed for instance by holding threshold values or all filter means types able to be operated with the filter device in the memory means 28, preferably in the form of a threshold value characteristic curve set, the selection means 46 being so designed that it may be employed to yield a type-specific threshold value selection. For this purpose it is possible for the selection means 46 to be designed to be manually actuated and for example to comprise a switch arrangement and/or a potentiometer arrangement, using which the desired preliminary selection may be made, for example in the factory or by the user himself It is however substantially more convenient to have the structure as in the working example, in the case of which the type-specific selection is brought by a second electrical selection signal 48, which is produced by a detection means 52 to be described later in detail, which is provided with means for recognition of the currently fitted filter means type.

It will be clear that in connection with the threshold value dependent on the type of filter means, inlet pressure dependent threshold value characteristic curves of the noted sort may be held in the memory means 28.

In the working embodiment illustrated the electronic evaluating means 27 comprises lastly an electronic preliminary select means 53, with which the threshold values for a respective filter means may be set in a variable form to allow for later adaptation, for example for new types of filter means.

The evaluating means 24 could in principle be mounted externally of the filter device 1 and communicate by suitable communication means with the pressure differential sensor means 25, the flow rate sensor means 26 and the detection means 52. A substantially more compact and straightforward arrangement is illustrated in the working example, in the case of which the evaluating means 27 is in the form of a direct component of the filter device 1. It is located in a communication module 54 preferably mounted in a detachable manner on the housing of the filter device 1, such module 54 having a first interface 55 for connection with the housing of the filter device and with electronic component contained in it and a second interface 56 for connection with an external electronic control means 31. This control means 31 may be memory programmable control means (SPS), which controls mechanical operation sequences of loads connected with the supply network and in which the indication signals 33 may be taken into account.

The electronic evaluating means 27 could also be designed in the form of a permanent integral component of the filter device. If the filter device 1 is in the form of a modular component of a servicing unit, the evaluating means 27 could be located at a different position in the servicing unit or on or in one of the other servicing diaphragms. Finally the evaluating means 27 could also be a component of a stand-alone module of a servicing unit.

The evaluating means 27 may be linked for control purposes with electronic components of other servicing devices of a servicing unit. It could be placed on an internal data bus. Furthermore, the evaluating means 27 could comprise -a field bus station, not illustrated, which renders possible communication with the control means 31 by way of serial signals, signal and data exchange being possible in both directions.

The above mentioned means 52 of the filter device 1 has, in the present working example, such a structure that it renders possible recognition of the type of the currently installed filter means 6 and can produce a detection signal dependent on the detected type of filter means, which signal is fed in the working example as a second selection signal 48 to the selection means 46. Furthermore, the detection means 52 can detect the presence and absence of a filter means on the filter device 1 and here as well produce at least one electrical detection signal dependent on the result of detection. Here it is to be noted that the detection means 52 and the recognition means 24 serving for the recognition of the degree of contamination of a filter means 6 do not necessarily have to be present at the same time, and same may be made in the filter device 1 alone and independently of one another. An electronic evaluating means 27 is however preferably present even in the absence of said recognition means 24, which then however may be produced in a "leaner" form than above described design so that at least evaluating the detection signals produced is possible. Furthermore, the communicative linking and placement of the electronic evaluating means 27 in connection with a detection means 52 may be the same as that described above in connection with the recognition means 24.

In the working embodiment the detection means 52 has activating means 57 provided on the installed filter means 6 or a filter means to be installed, which at least when the filter means is installed cooperate directly or indirectly with sensor means 58 on the housing in order to produce a detection signal which is able to be further processed. The working example shows a possible design with indirect cooperation between the activating means 57 and the sensor means 58 there being an intermediate placement of a particular means 62 which as a significant component comprises a plunger 63 able to be moved in the installation and deinstallation direction 21 and 22 of the filter means 6 in relation to the sensor means 58 fixed to the housing.

The plunger 63 is in the working example guided for sliding material on the principal body in the axial direction, the body having for this purpose an elongated plunger socket 64, which is open toward filter space 5, and which extends through the outlet flow section 8 of the principal fluid duct 14. The plunger is inserted coming from the filter space 5 into the plunger socket 64, which is sealed off at its end adjacent to the head piece 4 by a terminal wall 65. This means that the pressure medium flowing in the principal fluid duct may be prevented from leaking out through the plunger using 64 without particular sealing measures.

Figure 1:
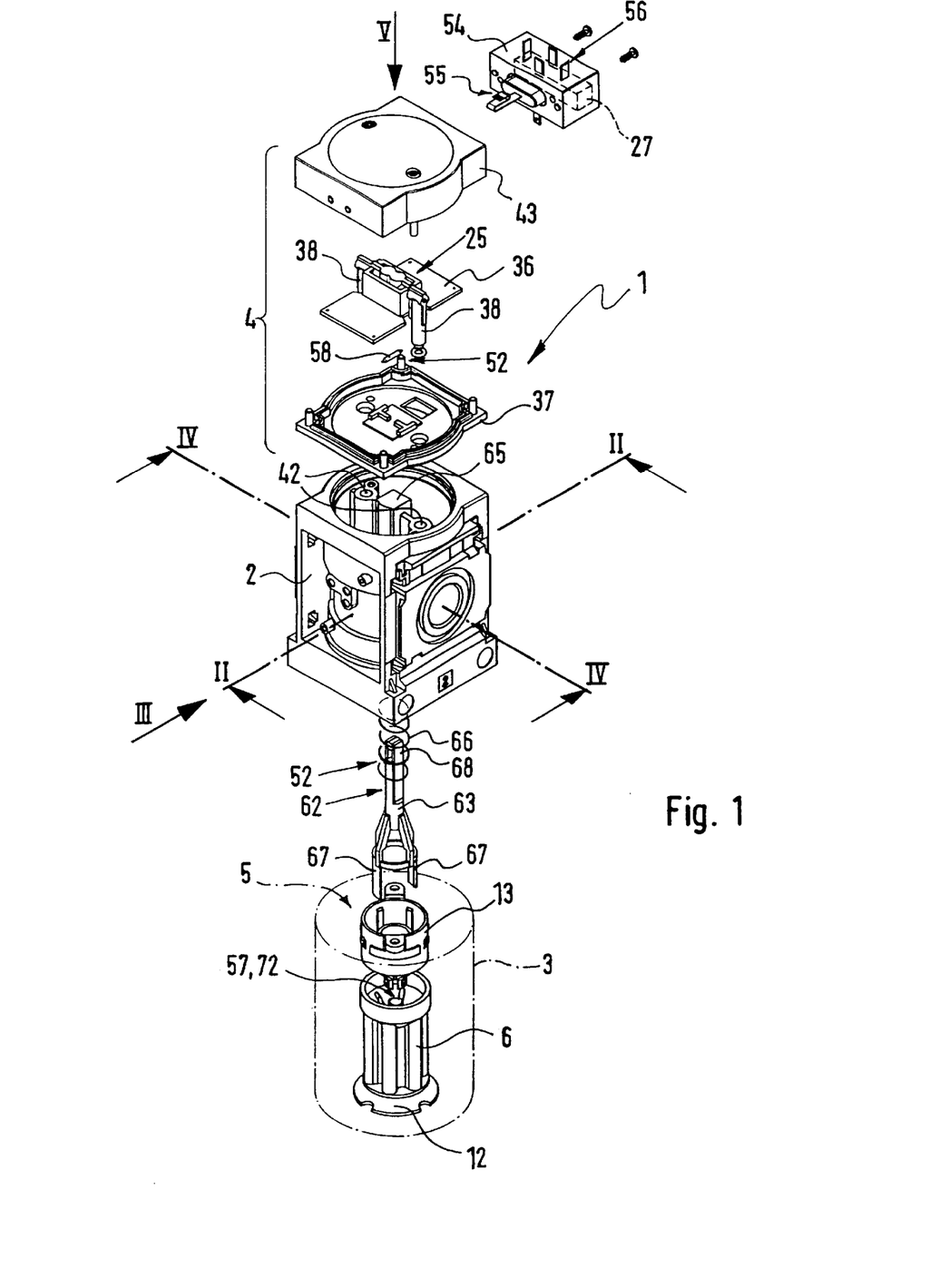
FIG. 1 shows a preferred embodiment of the filter device in accordance with the invention in an exploded, perspective view.
Figures 2, 3:
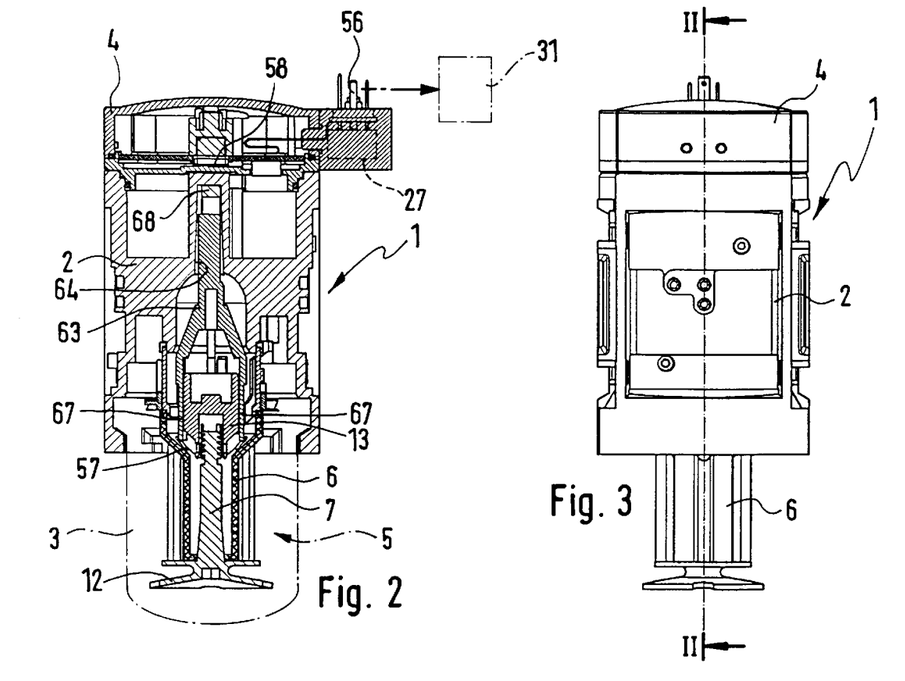
FIG. 2 shows the filter device of FIG. 1 in a longitudinal section taken on the section line II—II of FIGS. 1 and 3.
FIG. 3 is a lateral elevation of the filter device looking in the direction of the arrow II in FIG. 1.
Figure 4:
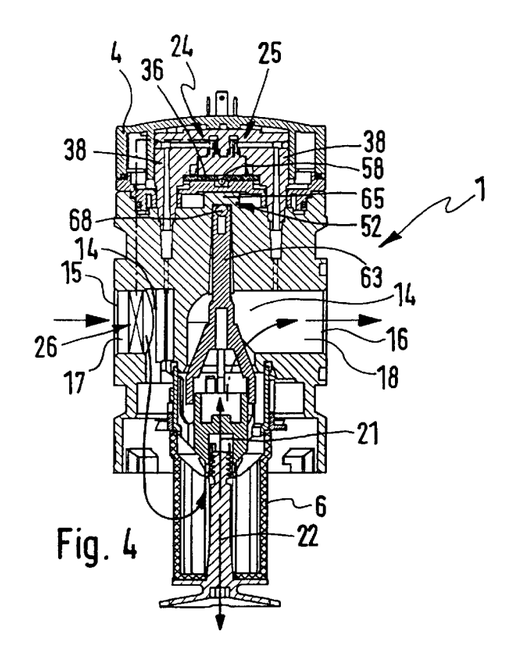
FIG. 4 shows a further longitudinal sectional representation of the filter device on the section line IV—IV of FIG. 1 with a section plane at a right angle to the representation of FIG. 2.
Figure 5:
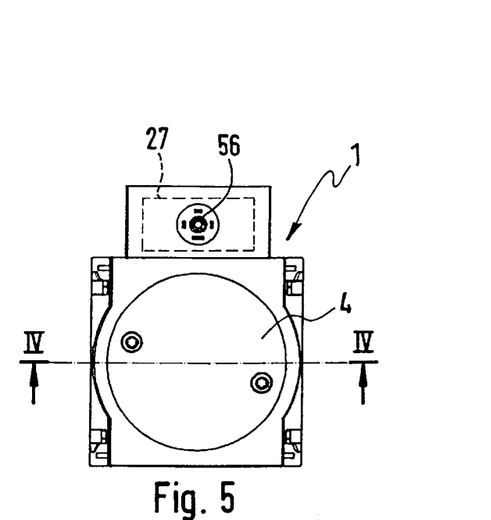
FIG. 5 is a view from above of the filter device looking in the direction of the arrow V in FIG. 1.

During assembly, after insertion of the plunger 63 the attachment part is brought into position, which prevents the plunger 63 slipping into the filter space 5. Owing to a return spring means 66 acting between the plunger 63 unit housing of the filter device 1 the plunger 63 is best biased toward an initial position, which it assumes when the filter means 6 is removed. There it bears against the attachment part 13 with a thrust toward the filter space 5, it however extending through and attachment part simultaneously at one or more axially extending drive portions 67 toward the filter space 5. The drive portions 67 may as in FIG. 1 be in the form of wings.

The sensor means 58 are placed in the range of sliding of the plunger 63 and in the working example are adjacent to the wall 65, so that they are axially in front of and clear of the associated end of the plunger socket 64. They are located in the interior of the head piece 4 and are fixed on the support plate 36, possibly provided with a pressure differential sensor means 25. By way of electrical lines, not illustrated, the sensor means 58 are connected with the evaluating means 27. In the working embodiment illustrated the sensor means 58 are designed in the form of magnetically activated sensor means, for example in the form of a so-called reed switch.

Actuating means 68 are provided on the plunger 63, which are entrained by the plunger 63 when it moves. In the working embodiment illustrated they are designed in the form of permanent magnet means which are arranged on the end, adjacent to the head piece 4 of the plunger 63.

The activating means 57 are in the working example constituted by an actuating face 72, which is provided on the end face, facing in the installation direction 21, of the filter means 6. On installation of the filter means 6 the actuating face 72 of same thrusts against the drive portions 67 of the plunger 63 and shifts same against the force of the return spring means 66 in the plunger socket 64 toward the head piece 4, the permanent magnet actuating means 68 drawing closer to the sensor means 58 responsive to a magnetic field and at the latest on reaching the desired terminal position of the filter means 6 produce an electrical detection signal. This detection signal may serve as a confirmation signal in order to confirm for a control means 61 the correct installation of a filter means 6 so that same may initiate the operation of loads connected with the compressed air network.

As an alternative to the above described magnetic detection it is possible to provide other detection systems operating free of physical contact, as for example an optical design. Furthermore mechanical cooperation between the plunger 63 and the sensor means would be conceivable, which in this case would for instance be in the form of a mechanical switch.

In the case of a further design the activating means 57 provided on the filter means 6 directly cooperate with the sensor means 58 mounted on the housing without an additional signal transmission means having to be placed in between.

It would be naturally possible to design so that a detection signal would be produced absent a filter means 6. By the same token separate detection signals could be produced on the one hand after removal of the filter means and on the other hand with the filter means installed, something which could be ensured in the working example by having a plurality of magnetic field responsive sensors placed at different points along the path of shifting of the permanent magnet actuating means 68. Similarly a multi-stage switch or a plurality of individual mechanical switches could be installed.

The detection means 52 can, as mentioned, also be so designed that the currently installed type of filter means is specifically recognized. The corresponding detection signal can then be employed both as a plain confirm signal for the presence or, respectively, absence of a filter means 6 and also for initiating steps in connection with the filter type. This detection behavior may be produced for example by having different sizes of the shift of the plunger 63 in accordance with different filter types and accordingly having a signal dependent on the stroke of the plunger 63.

A extremely simple measure for ensuring different strokes of the plunger 63 is such that the actuating faces 72 provided on the individual filter means 6 are arranged in different manners and/or are designed to be different to each other. Thus, it is possible for the actuating faces 72 to be differently positioned in relation to the installation and deinstallation 21 and 22 and as seen in the installed state of the respective filter means 6, that is to say at a greater or smaller distance from the principal body 2. The plunger 63 is then shifted, dependent on the type of filter means a shorter or longer distance toward the head piece 4. By using sensor means 58, which are made up of suitably placed individual sensors or which have a multi-stage sensor behavior, it is possible to ascertain the corresponding filter means types 6 without any problems. In other words the actuating means 68 and the sensor means 58 could be designed in the form of any suitable position detecting means, recourse being had to an analog displacement measuring system as well in order to render possible a highly reliable position detection system.

The activating means 57 do not necessarily have to be directly mounted on the filter means 6. A different arrangement of the respective filter means 6 would be also conceivable, as for example with the integration in the attachment screw 7 in connection with the filter means 6, which, dependent on type, have different overall lengths. It is in this manner that there will be a different depth of screwing in of the attachment screw 7 dependent on the type of the filter means 6, something which again may be employed for activating the sensor means. In all cases the inclusion of a signal transmission means 62 does offer the advantage that there is no excessive moisture or gage pressure in the interrogation zone so that no special protective measures are required.

The position interrogation of the activating means 57 or, respectively, the actuating means 72 activated by same may be performed on the above mentioned basic principles in numerous variations, only a few possibilities being indicated for example. Thus, it would be for instance possible to have one or more microswitches, which are directly actuated or mechanically actuated with the aid of a lever. In this case microswitches, which could be approached from the side, could be utilized. Moreover, sliding switches would be possible having a number of switching positions equal to the number of filter means 6 to be detected, spring contact switches also coming into question.

If optical interrogation of the position were to be employed use might be made of a forked photoelectric detector or of the triangulation principle.

Furthermore the interrogation of interrogations only does not have to take place in conjunction with the end of a plunger 63, and could take place at any point along the length thereof. Such a design is more particularly to be recommended when the return spring means 66 is placed in front of the plunger and bears against its end face and the terminal wall 65 so that the actuating means 68 provided on the plunger 63 could not be moved far enough to the sensor means placed outside the terminal wall.

The above mentioned measures means that when required a filter device may be produced which automatically indicates the necessary inspection and cleaning interval so that such measure are only performed when they are in fact needed. For the communication with a external control means use may be made of known communication means including inter alia infrared or wireless transmission so that the degree of contamination or, respectively, the service life of the presently employed filter means 6 could be ascertained by telemetry.

What is claimed is:

1. A filter device for filtering compressed air comprising a principal fluid duct extending between an inlet and an outlet and divided by filter means, through which compressed air flows in operation, into an inlet flow section and an outlet flow section, means for the recognition of the degree of contamination of the filter means, which comprise a pressure differential sensor means responsive to the pressure differential between the inlet flow section and the outlet flow section and furthermore a flow rate sensor means responsive to the rate of flow in the principal fluid duct and is further provided with an electronic evaluating means for linking the detected pressure differential data and the flow rate data to produce a condition value relevant for the degree of contamination of the filter means for comparison with predetermined threshold values, characterized by a housing with a principal body having the inlet and the outlet, and on whose lower side a filter shell (3) is detachably and sealingly attached, which together with the principal body delimits a filter space receiving the filter means and at the top on the principal body a head piece is mounted containing the pressure differential sensor means.

2. The filter device as set forth in claim 1, characterized in that the evaluating means comprises a comparison means for performing a comparison between the condition valve found and the predetermined threshold values.

3. The filter device as set forth in claim 1, characterized in that the evaluating means comprises a memory means for holding threshold values applying at least one filter means.

4. The filter device as set forth in claim 3, characterized in that in the memory means threshold values applying for a plurality of different types of filter means are stored and in that a selection means is present for type-specific threshold value selection.

5. The filter device as set forth in claim 4, characterized in that the selection means is able to be manually operated and for example comprises a switch arrangement and/or a potentiometer arrangement.

6. The filter device as set forth in claim 4, characterized in that a detected means is present having means for the recognition of the currently installed type of filter means, such detection producing a filter means type specific electrical detection signal, which is employed for the type specific threshold value selection in the selection means.

7. The filter device as set forth in claim 6, characterized in that the detection means possesses activating means for the filler means, and such activating means cooperate, when the filter means is installed, directly or indirectly for the production of a detection signal with sensor means on the housing.

8. The filter device as set forth in claim 7, characterized by mechanically activated sensor means, as for example in the form of mechanical switches or sensor means operating without physical contact, activated for instance optically or magnetically.

9. The filter device as set forth in claim 1, characterized in that the means for the recognition of the degree of contamination of the filter means comprises an inlet pressure sensor means responsive to the inlet pressure value in the inlet flow section of the principal fluid duct, the inlet pressure value found being taken into account in the electronic evaluating means in finding the current condition value.

10. The filter device as set forth in claim 9, characterized in that in a memory means different threshold values applying respectively for one or more filter means types in a manner dependent on the inlet pressure are held, which threshold values are able to be selected with the aid of a selection means dependent on the inlet pressure.

11. The filter device as set forth in claim 1, characterized in that a preliminary select means is present making possible a variable predetermination of the threshold values applying for a filter means.

12. The filter device as set forth in claim 1, characterized in that an indicating means is present for indicating the current condition value and/or for indicating when the threshold values applying for the respective filter means is reached or exceeded.

13. The filter device as set forth in claim 1, characterized in that the threshold values applying for a particular filter means are present in the form of an inlet flow section characteristic curve or of a threshold value characteristic curve set.

14. The filter device as set forth in claim 1, characterized in that additionally a provided threshold value is present in the form of a maximum pressure differential value dependent on the flow rate.

15. The filter device as set forth in claim 1, characterized in that the evaluating means is designed in the form of a direct component of the filter device or of a compressed air servicing unit comprising the filter device.

16. The filter device as set forth in claim 1, characterized in that the evaluating means is connected with a control means, as for example with a memory programmable control means (SPS).

* * * * *

UNITED STATES PATENT AND TRADEMARK OFFICE
CERTIFICATE OF CORRECTION

PATENT NO. : 6,703,937 B1
DATED : May 14, 2004
INVENTOR(S) : Franz et al.

It is certified that error appears in the above-identified patent and that said Letters Patent is hereby corrected as shown below:

<u>Title page,</u>
Item [74], *Attorney, Agent or Firm*, now reads "Hoffman & Baron, LLP", should read -- Hoffmann & Baron, LLP --.

<u>Column 6,</u>
Line 1, now reads, "inlet pressure pi, it would be possible", should read -- inlet pressure $p_1$, it would be possible --.

Signed and Sealed this

Twentieth Day of July, 2004

JON W. DUDAS
*Acting Director of the United States Patent and Trademark Office*